United States Patent
Sesti et al.

(10) Patent No.: US 9,233,641 B2
(45) Date of Patent: Jan. 12, 2016

(54) VEHICULAR CAMERA WITH ALIGNED HOUSING MEMBERS AND ELECTRICAL CONNECTION BETWEEN ALIGNED HOUSING MEMBERS

(75) Inventors: Matthew C. Sesti, Williamston, MI (US); Steven V. Byrne, Goodrich, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 385 days.

(21) Appl. No.: 14/001,272

(22) PCT Filed: Feb. 22, 2012

(86) PCT No.: PCT/US2012/026073
§ 371 (c)(1),
(2), (4) Date: Aug. 23, 2013

(87) PCT Pub. No.: WO2012/116043
PCT Pub. Date: Aug. 30, 2012

(65) Prior Publication Data
US 2013/0328672 A1     Dec. 12, 2013

Related U.S. Application Data

(60) Provisional application No. 61/446,975, filed on Feb. 25, 2011, provisional application No. 61/593,962, filed on Feb. 2, 2012.

(51) Int. Cl.
*H04N 5/225*     (2006.01)
*B60Q 9/00*      (2006.01)
(Continued)

(52) U.S. Cl.
CPC ............... *B60Q 9/008* (2013.01); *H01R 12/91* (2013.01); *B60R 11/04* (2013.01); *H01R 12/716* (2013.01); *H01R 13/112* (2013.01)

(58) Field of Classification Search
CPC ...... B60Q 9/008; H01R 12/91; H01R 13/112; H01R 12/716; B60R 11/04
USPC ......... 348/118, 148, 149, 151, 373, 374, 376, 348/162, 153, 159, 161; 439/248
See application file for complete search history.

(56) References Cited

U.S. PATENT DOCUMENTS 4,641,901 A * 2/1987 Brennan ............ H01R 13/6581
                                                   439/344
5,550,677 A   8/1996 Schofield et al.
(Continued)

OTHER PUBLICATIONS

International Search Report and Written Opinion dated Jun. 19, 2012 from corresponding PCT application No. PCT/US2012/026073.

*Primary Examiner* — Yogesh Aggarwal
(74) *Attorney, Agent, or Firm* — Gardner, Linn, Burkhart & Flory, LLP (57) ABSTRACT

A camera for mounting on a vehicle includes a front housing member that holds a lens member, an imaging element and a circuit board with a set of front electrical connectors thereon, and a rear housing member that holds a set of rear electrical connectors that are directly mounted to the front electrical connectors. The rear housing member is aligned to the front housing member with respect to a first axis. The front and rear electrical connectors are able to accommodate misalignment along two axes which are generally orthogonal to each other and to the first axis. The front and rear electrical connectors may be directly connected so that a jumper wire is not needed. Also, by aligning the front and rear housing members, the overall space occupied by the camera may be reduced.

20 Claims, 9 Drawing Sheets (51) Int. Cl.
*H01R 12/91* (2011.01)
*B60R 11/04* (2006.01)
*H01R 12/71* (2011.01)
*H01R 13/11* (2006.01)

(56) References Cited

U.S. PATENT DOCUMENTS

| | | | |
|---|---|---|---|
| 5,670,935 A | 9/1997 | Schofield et al. | |
| 5,803,758 A * | 9/1998 | Kameyama | H01R 13/6315 |
| | | | 439/248 |
| 5,949,331 A | 9/1999 | Schofield et al. | |
| 6,089,903 A | 7/2000 | Gray et al. | |
| 6,222,447 B1 | 4/2001 | Schofield et al. | |
| 6,498,620 B2 | 12/2002 | Schofield et al. | |
| 6,605,775 B1 | 8/2003 | Seeber et al. | |
| 6,611,202 B2 | 8/2003 | Schofield et al. | |
| 6,636,258 B2 | 10/2003 | Strumolo | |
| 7,145,519 B2 | 12/2006 | Takahashi et al. | |
| 7,161,616 B1 | 1/2007 | Okamoto et al. | |
| 7,230,640 B2 | 6/2007 | Regensburger et al. | |
| 7,248,283 B2 | 7/2007 | Takagi et al. | |
| 7,295,229 B2 | 11/2007 | Kumata et al. | |
| 7,301,466 B2 | 11/2007 | Asai | |
| 7,381,089 B2 | 6/2008 | Hosler, Sr. | |
| 7,492,262 B2 | 2/2009 | Washington | |
| 7,592,928 B2 | 9/2009 | Chinomi et al. | |
| 7,859,565 B2 | 12/2010 | Schofield et al. | |
| 8,194,132 B2 | 6/2012 | Dayan et al. | |
| 8,866,907 B2 | 10/2014 | McElroy et al. | |
| 9,041,806 B2 | 5/2015 | Baur et al. | |
| 2006/0171704 A1* | 8/2006 | Bingle | B60R 11/04 |
| | | | 396/419 |
| 2006/0212624 A1 | 9/2006 | Kim | |
| 2006/0254805 A1 | 11/2006 | Scherer et al. | |
| 2009/0244361 A1 | 10/2009 | Gebauer et al. | |
| 2010/0097519 A1* | 4/2010 | Byrne | B60R 1/00 |
| | | | 348/373 |
| 2010/0118145 A1 | 5/2010 | Betham et al. | |
| 2011/0310248 A1* | 12/2011 | McElroy | H04N 5/2254 |
| | | | 348/148 |
| 2012/0062743 A1 | 3/2012 | Lynam et al. | |
| 2012/0154591 A1 | 6/2012 | Baur et al. | |
| 2013/0242099 A1 | 9/2013 | Sauer et al. | |
| 2013/0314503 A1 | 11/2013 | Nix | |
| 2013/0328672 A1 | 12/2013 | Sesti et al. | |
| 2014/0022390 A1 | 1/2014 | Blank et al. | |
| 2014/0138140 A1 | 5/2014 | Sigle | |
| 2014/0152778 A1 | 6/2014 | Ihlenburg | |
| 2014/0218535 A1 | 8/2014 | Ihlenburg | |
| 2014/0247355 A1 | 9/2014 | Ihlenburg | |
| 2014/0313339 A1 | 10/2014 | Diessner | |
| 2014/0340510 A1 | 11/2014 | Ihlenburg | |
| 2014/0354878 A1 | 12/2014 | Winter | |
| 2014/0373345 A1 | 12/2014 | Steigerwald et al. | |
| 2015/0222795 A1 | 8/2015 | Sauer et al. | |

* cited by examiner

VEHICULAR CAMERA WITH ALIGNED HOUSING MEMBERS AND ELECTRICAL CONNECTION BETWEEN ALIGNED HOUSING MEMBERS

CROSS REFERENCE TO RELATED APPLICATIONS

The present application is a 371 national phase filing of PCT Application No. PCT/US2012/026073, filed Feb. 22, 2012, which claims the filing benefit of U.S. provisional applications, Ser. No. 61/593,962, filed Feb. 2, 2012, and Ser. No. 61/446,975, filed Feb. 25, 2011, which are hereby incorporated herein by reference in their entireties.

FIELD OF THE INVENTION

The present invention relates to cameras for use in vehicles, and more particularly to rearview cameras.

BACKGROUND OF THE INVENTION

A typical camera for mounting on a vehicle has a lens member, an imaging element, a circuit board and housing members that connect together. In particular, for certain applications, such as for some applications wherein the camera is rearwardly facing and is mounted in a rear panel on a vehicle, there can be relatively severe space restrictions for the camera. However, other vehicular camera applications also impose space restrictions on the camera. Additionally, some cameras are relatively complex assemblies that are expensive, and can suffer from reliability problems due to the number of components and the number of individual electrical connections that are associated therewith. In particular, some cameras have a front housing which holds a circuit board and a rear housing which mounts in a tight alignment with the front housing member and which houses electrical connectors (i.e. pins). At the distal end of the rear housing member are the terminals of the pins, which connect via a cable assembly to another component in the vehicle. At the front end of the rear housing member, a jumper is typically used to connect the front ends of the pins to the circuit board. This solution is used because it accommodates variation in the positions of the pins in the rear housing member and in the positions of the points on the circuit board intended to connect to the pins.

It would be advantageous to provide a camera that addresses one or more of these considerations.

SUMMARY OF THE INVENTION

The present invention provides a camera for mounting at a vehicle that includes aligned front and rear portions of a housing and provides direct electrical connection of electrical connectors or terminals at the front and rear portions of the housing.

According to a first aspect of the present invention, a camera for mounting on a vehicle includes a front housing member that holds a lens member, an imaging element and a circuit board with a set of front electrical connectors thereon, and a rear housing member that holds a set of rear electrical connectors that are directly mounted to the front electrical connectors (i.e. without the use of a jumper). The rear housing member is aligned to the front housing member with respect to a first axis. The front and rear electrical connectors are able to accommodate misalignment along two axes which are orthogonal to the each other and to the first axis.

By directly mounting the front and rear electrical connectors, a jumper wire is not needed, thereby reducing cost and eliminating potential sources of circuit failures that are associated with the use of jumper wires. By aligning the front and rear housing members, the overall space occupied by the camera is smaller, which is advantageous particularly when the camera is to be used in tight spaces.

In one embodiment, the camera includes a front camera housing member, a lens member mounted to the front housing member, an imager that is positioned to receive images through the lens member, a circuit board mounted to the front housing member, and a rear camera housing member. The circuit board comprises circuitry that is configured or operable to receive signals from the imager and to send signals to another component. The circuit board has a plurality of front electrical connectors thereon. The rear camera housing member has a rear housing alignment structure that mates with a front housing alignment structure to align the rear camera housing member with respect to the front camera housing member along a first axis. The rear camera housing member has a plurality of rear electrical connectors extending therefrom. The rear electrical connectors are electrically connected to the front electrical connector. One set of the sets of front and rear electrical connectors is a set of male electrical connectors and the other set of the sets of front and rear electrical connectors is a set of female electrical connectors. Each female electrical connector has a jaw structure including first and second jaws. The first and second jaws together define a second axis along which the first and second jaws clamp one of the male electrical connectors. The second axis is generally perpendicular to the first axis. The first and second jaws have a width that is sized so that the male electrical connector is positionable therebetween over a range of positions along the second axis. The female electrical connector has a jaw structure biasing member that biases the jaw structure towards a home position but permits movement of the jaw structure along a third axis that is generally perpendicular to the first and second axes.

These and other objects, advantages, purposes and features of the present invention will become apparent upon review of the following specification in conjunction with the drawings.

BRIEF DESCRIPTION OF THE DRAWINGS

The present invention will now be described by way of example only with reference to the attached drawings, in which.

DETAILED DESCRIPTION OF THE INVENTION

Figure 1:
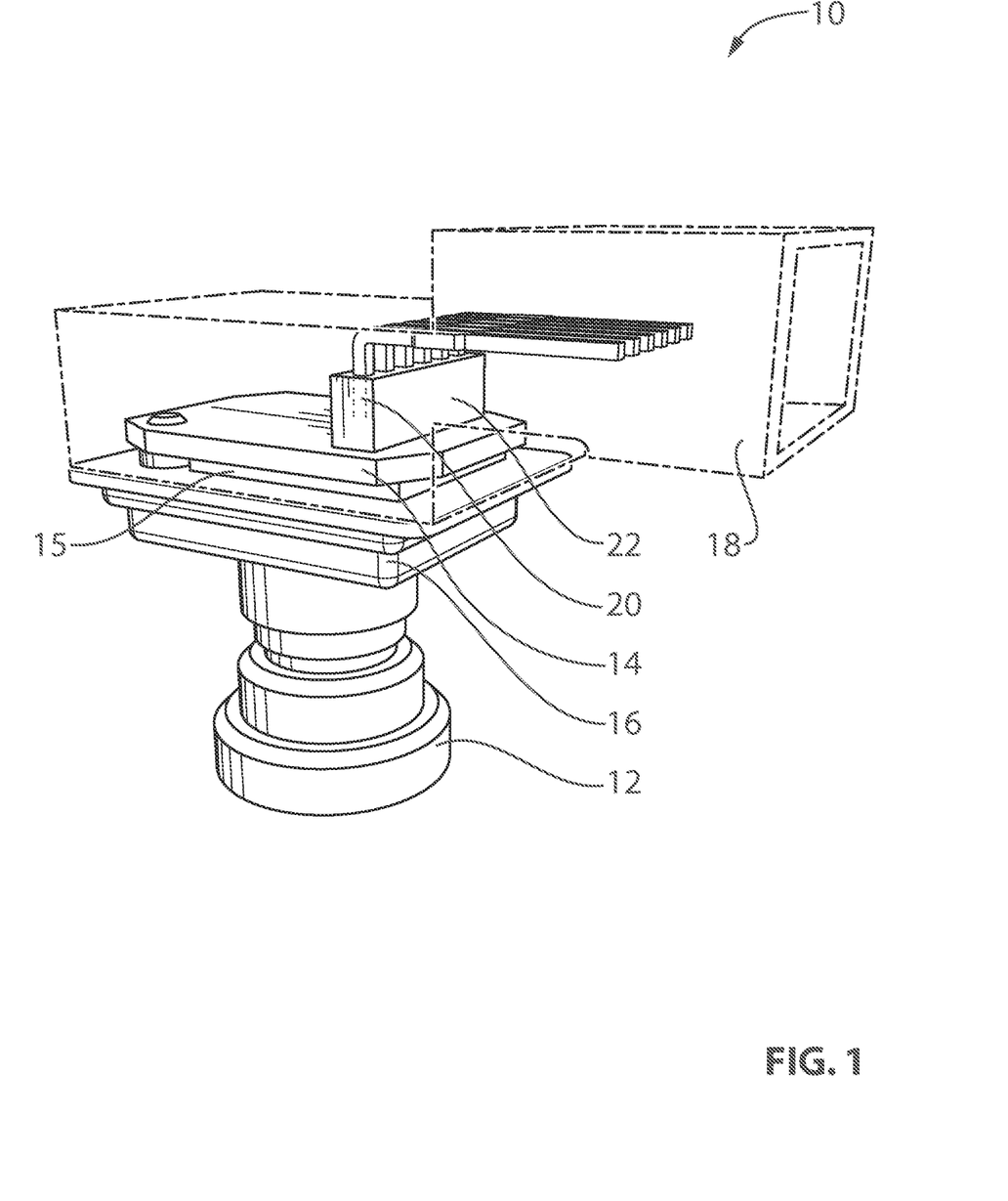
FIG. 1 is a perspective view of a camera in accordance with an embodiment of the present invention.

Reference is made to FIG. 1, which shows a camera 10 for use in a vehicle (not shown), and in particular for use as a rearview camera in a vehicle. The camera 10 includes an optical element or lens assembly or lens member 12, a circuit board 14, an imager 15, a front housing member 16 and a rear housing member 18 (shown in FIG. 1 as being transparent). The lens member 12 may be any suitable lens member known in the art, and is mounted to the front housing member 16. In some instances the lens member 12 may a separate element from the front housing member 16, or it may be integral with the front housing member 16.

Note that the terms 'front' and 'rear' as used in the present document refer to the front of the camera 10 (i.e., the portion of the camera where the lens member is located), and the rear of the camera 10 (i.e., the portion of the camera 10 opposite the front of the camera 10). When the camera 10 is used in a rearview application in a vehicle (such as when the camera is mounted at a rear portion of a vehicle and has a rearward field of view rearward of the vehicle), the front of the camera 10 thus faces rearwardly relative to the vehicle and the rear of the camera 10 faces towards the front of the vehicle.

The lens member 12 is positioned in a selected position to receive images and focus them on the imager 15. The imager 15 may be any suitable imaging element, such as an imaging array of photosensors or such as a charge-coupled device (CCD) or a complementary metal-oxide semiconductor (CMOS) sensor, such as discussed below. The circuit board 14 receives signals from the imager 15 and sends signals to one or more other components of the vehicle, such as a control device (not shown) within the vehicle. The imaging element 15 may be mounted directly onto the circuit board 14. The circuit board 14 is mounted to the front housing member 16.

Figure 2:
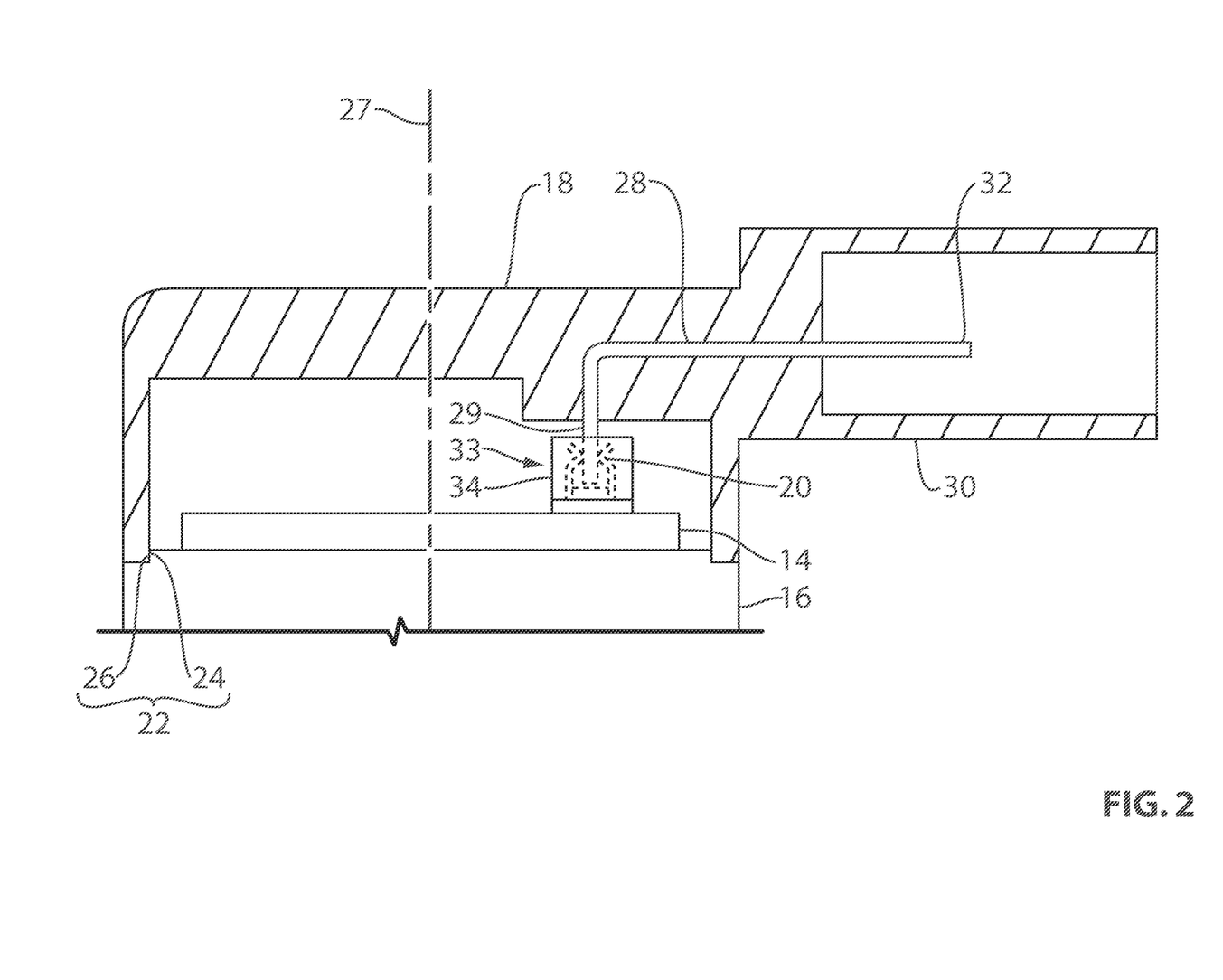
FIG. 2 is a sectional view of a portion of the camera shown in FIG. 1.

Referring to FIG. 2, the rear housing member 18 mounts to the front housing member 16 in a fixed position by virtue of an alignment structure 22, which aligns the rear housing member 18 in a specific position relative to the front housing member 16. The alignment structure 22 may be made up of any suitable rear housing alignment structure and any suitable front housing alignment structure which mate together to align the rear housing portion 18 with respect to the front housing member 16 along a first axis 27. For example, the alignment structure 22 may include a peripheral edge portion 24 on the rear housing member 18 that mates with a press fit onto a peripheral shoulder 26 on the front housing member 16. In an alternative embodiment, the alignment structure 22 may include a plurality of threaded fasteners (not shown), which pass through fastener apertures (not shown) on one of the housing members 16 or 18 and into threaded apertures (not shown) in the other of the housing members 16 or 18. An adhesive or some other means of joining or permanently joining the front and rear housing members 16 and 18 together may also be provided. For example, the housing members 16 and 18 may be welded together or otherwise bonded or joined.

The front and rear housing members 16 and 18 may be made from any suitable material, such as a polymeric material, such as a material called Xenoy™ from Sabic Americas, Inc. in Houston, Tex., USA. Alternatively to Xenoy™, any other type of PBT (Polybutylene Terephthalate) or PBT/PC (a blend of Polybutylene Terephthalate and Polycarbonate) or other suitable material may be used. In instances wherein the front and rear housing members 16 and 18 may build up a static electrical charge, it is preferable to provide means to inhibit such a build up so as to protect components such as the circuit board 14.

A set of front electrical connectors 20 are connected to the circuit board 14, which are female electrical connectors. The rear housing member 18 has a set of rear electrical connectors 28 therein which, in the illustrated embodiment, are male electrical connectors. The rear electrical connectors 28 may be incorporated into the rear housing member 18 by any suitable means, such as by insert molding. The male electrical connectors 28 have first terminals 29 that mate with the female electrical connectors 20 on the circuit board 14, and second terminals 32, which are contained in a vehicle connection portion 30 of the rear housing member 18. The vehicle connection portion 30 is configured to connect to or receive a vehicle connector (such as a connector of a vehicle wiring harness or the like), which connects the circuit board 14 to some other component in the vehicle such as a control unit (not shown). The vehicle connection portion 30 need not be as shown. For example, the vehicle connection portion 30 may instead include a wire harness connected to the male electrical connectors 28, and a housing with pins therein connected to a distal end of the wire harness.

Figure 3:
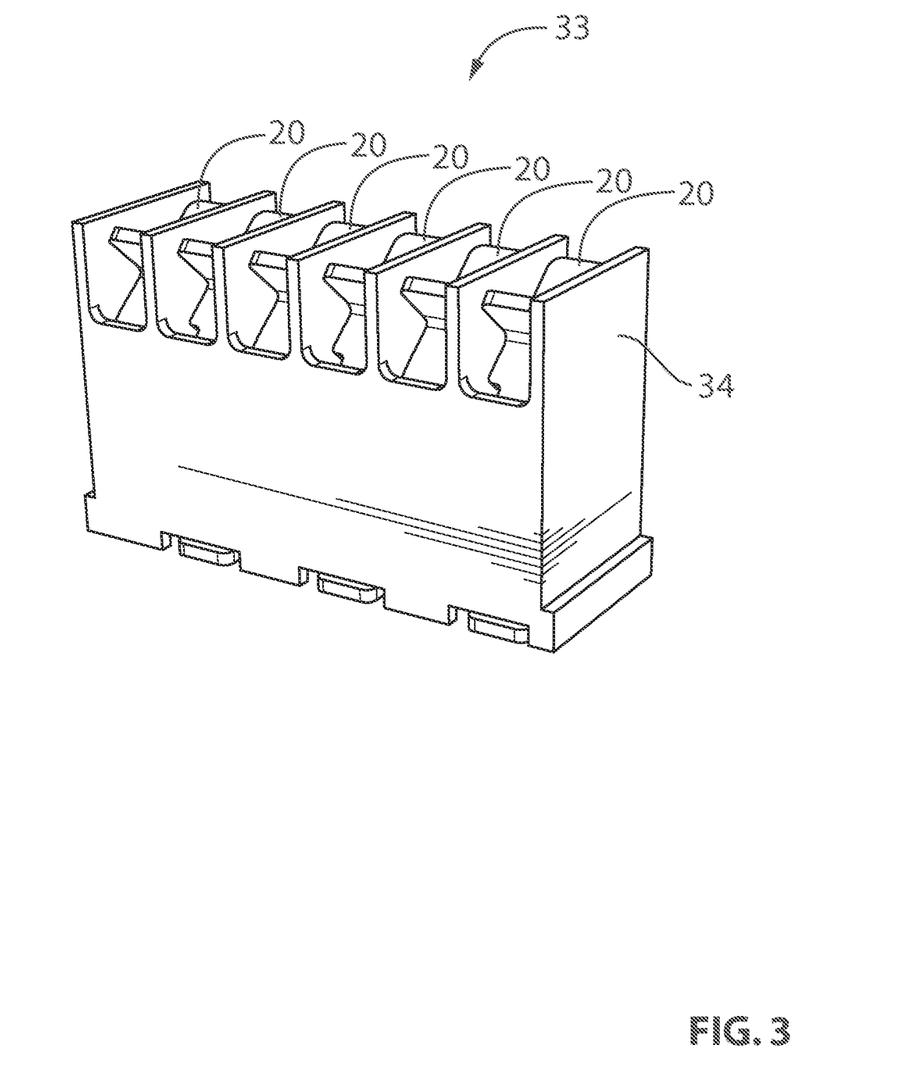
FIG. 3 is a magnified perspective view of a female electrical connector assembly from the camera shown in FIG. 1.
Figure 4:
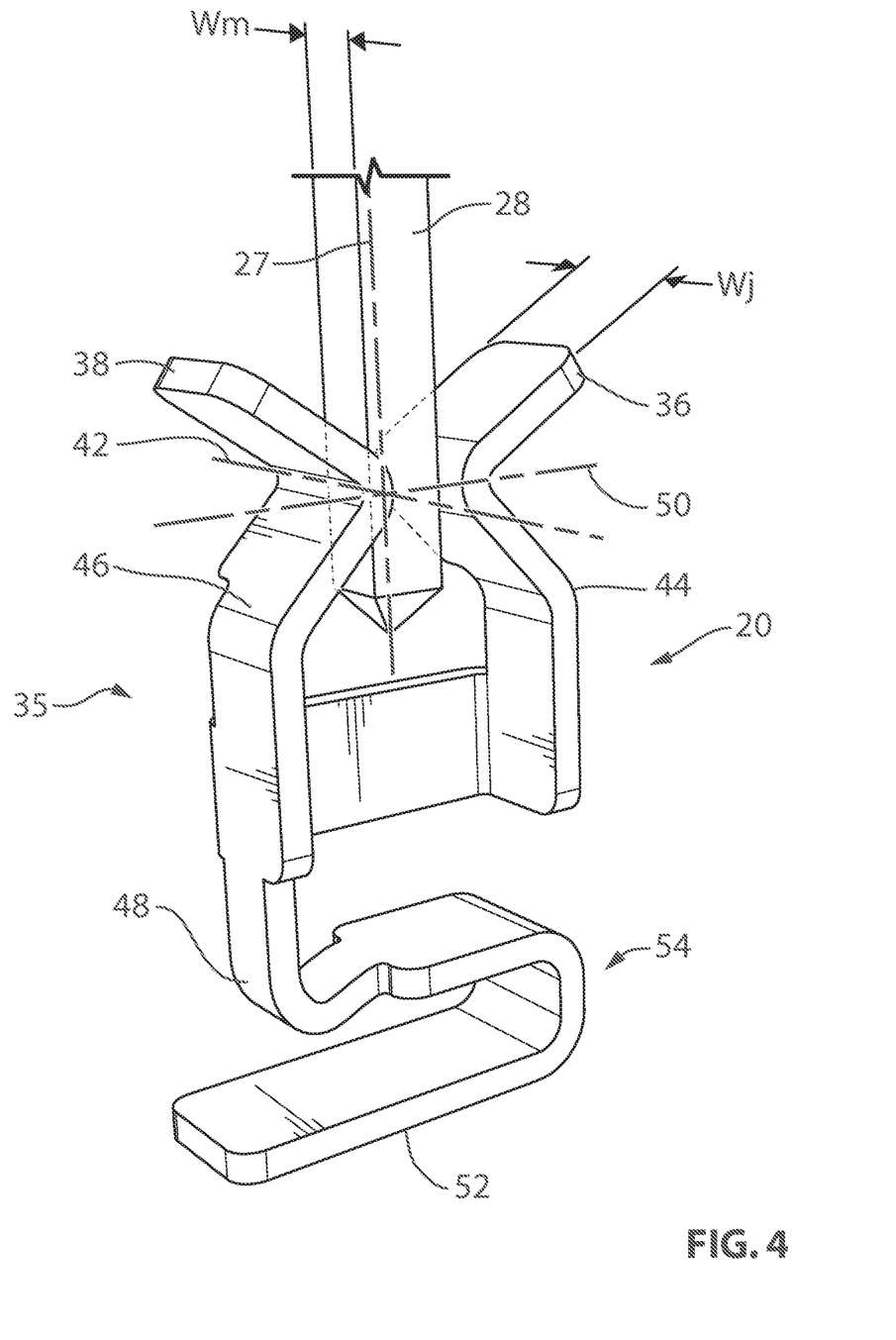
FIG. 4 is a magnified perspective side view of a female electrical connector from the female electrical connector assembly shown in FIG. 3.

Reference is made to FIG. 3, which shows a female electrical connector assembly 33, which the female electrical connectors are a part of. The female electrical connector assembly 33 includes a plurality of the female electrical connectors 20 and a connector housing 34. Referring to FIG. 4, each female electrical connector 20 has a jaw structure 35 including first and second jaws 36 and 38. The first and second jaws 36 and 38 are biased towards each other so that they clamp the male electrical connector 28 therebetween. The first and second jaws 36 and 38 together define a clamping line 42 may be referred to as a second axis along which they clamp the male electrical connector 28. The jaws 36 and 38 have a width Wj that is larger than the width (shown at Wm in FIG. 4) of the male electrical connector 28 so that the male electrical connector 28 is positionable between the jaws 36 and 38 over a range of positions along the second axis 42. The jaws 36 and 38 are biased towards each other by jaw biasing members 44 and 46, which may be any suitable biasing members such as leaf springs. The jaw structure 35 is biased towards a home position by a jaw structure biasing member 48, to which the jaw structure 35 is connected. The jaw structure biasing member 48 may be any suitable biasing member such as a leaf spring and permits movement of the jaw structure 35 along a third axis 50 (see FIG. 5) that is generally perpendicular to the first and second axes 27 and 42. As a result, the male electrical connector 28 can be received in the jaws 36 and 38 of the female electrical connector 20 over a range of positions along the third axis 50.

Figure 6:
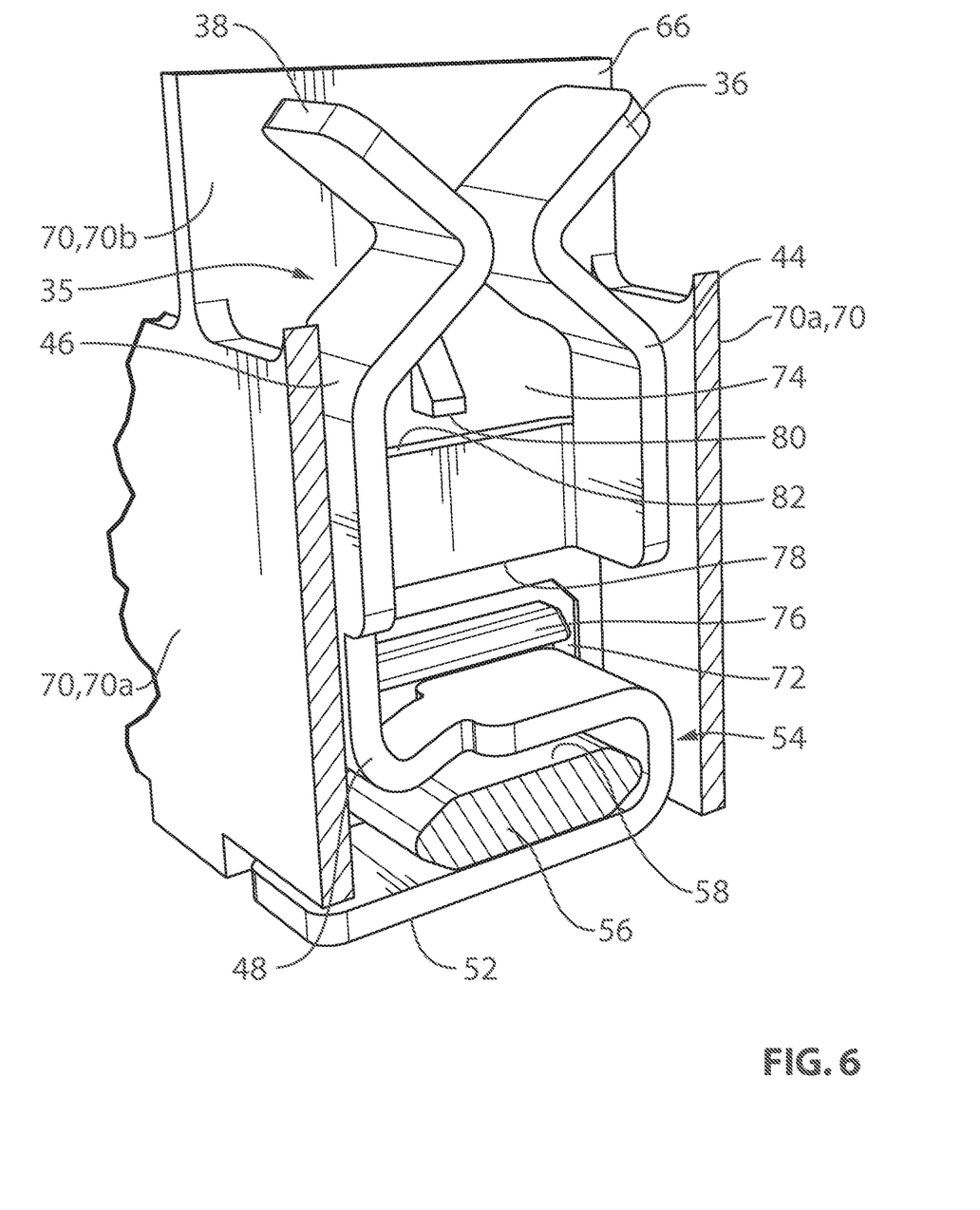
FIG. 6 is a magnified sectional perspective view of the female electrical connector assembly shown in FIG. 3.

The female electrical connector 20 further includes a contact 52 that is positioned for connecting to the circuit board 14. The contact 52 has a suitable surface area over which to connect to an electrical trace on the circuit board 14. The female electrical connector 20 further includes a clamp portion 54, which is sized to clamp onto a base member 56 (FIGS. 6 and 7) that forms part of the connector housing 34. The contact 52 forms part of the clamp portion 54.

The female electrical connector 20 is preferably formed from a single piece of material that is cut and bent as necessary. The connector 20 may be made from any suitable material, such as a copper alloy or the like. An example material is tin-plated C15219 phosphor bronze, but other materials may be used.

Figure 7:
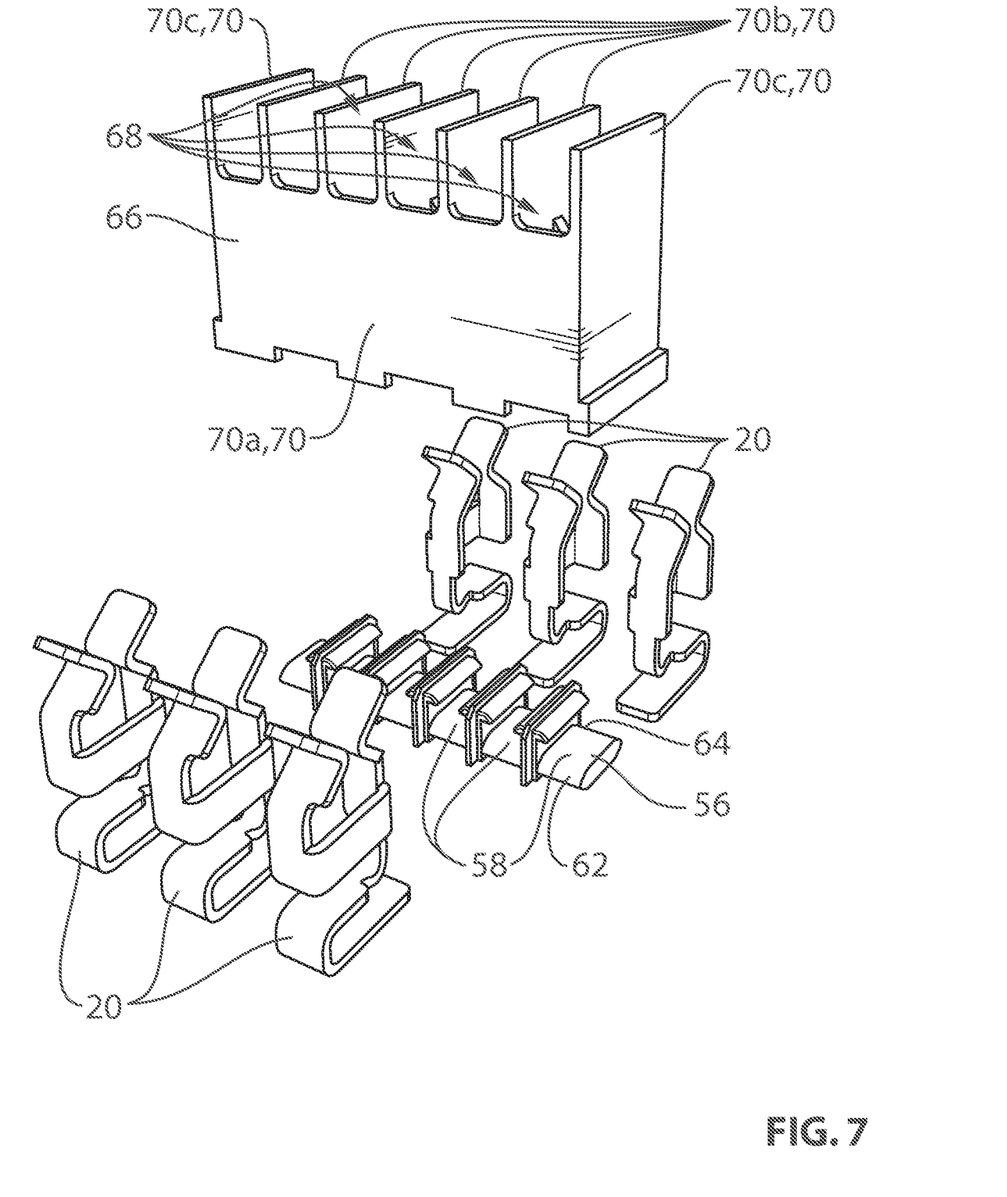
FIG. 7 is an exploded view of the female electrical connector assembly shown in FIG. 3.
Figure 8A:
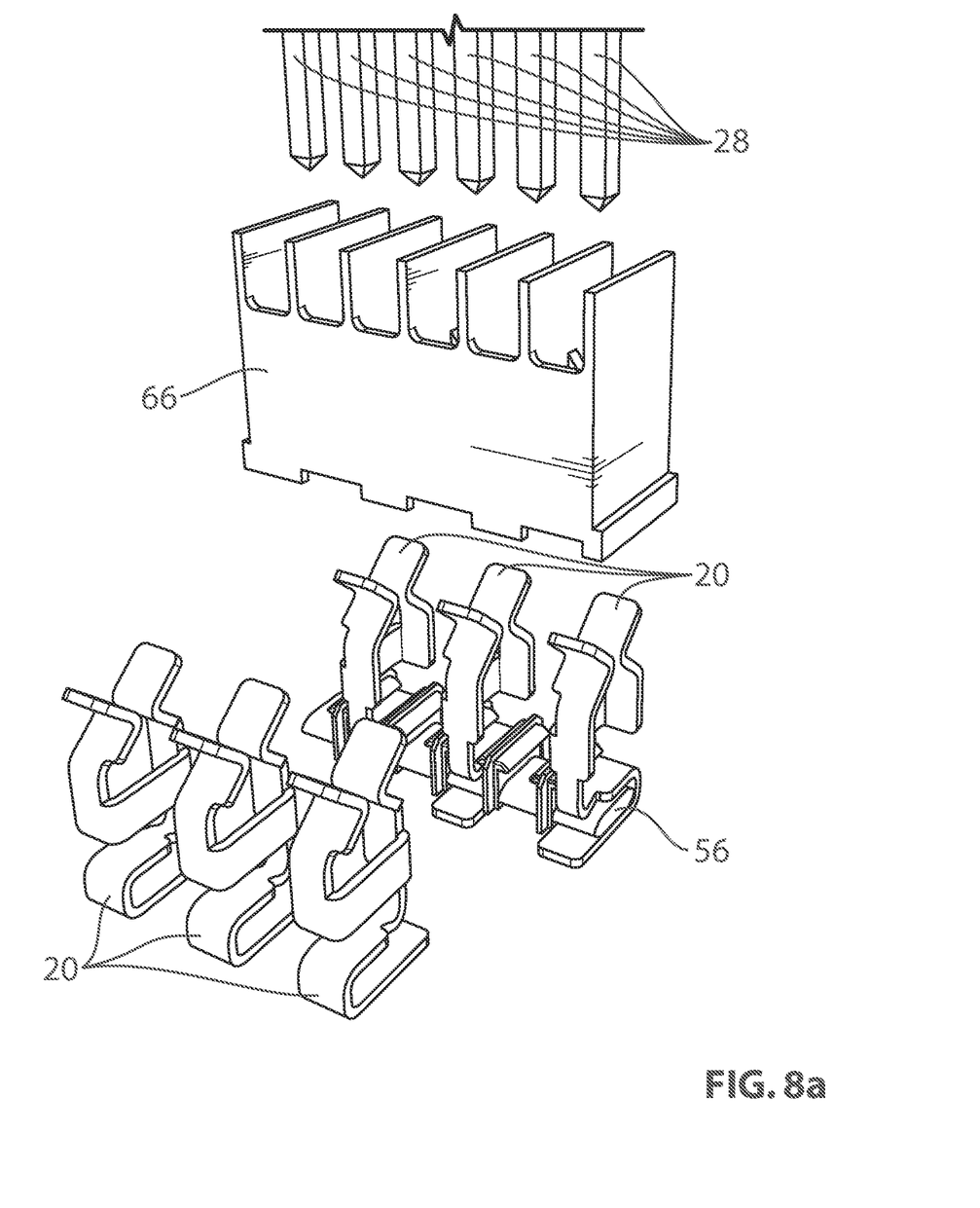
FIGS. 8a and 8b are perspective views illustrating stages of assembly of the female electrical connector assembly shown in FIG. 3.
Figure 8B:
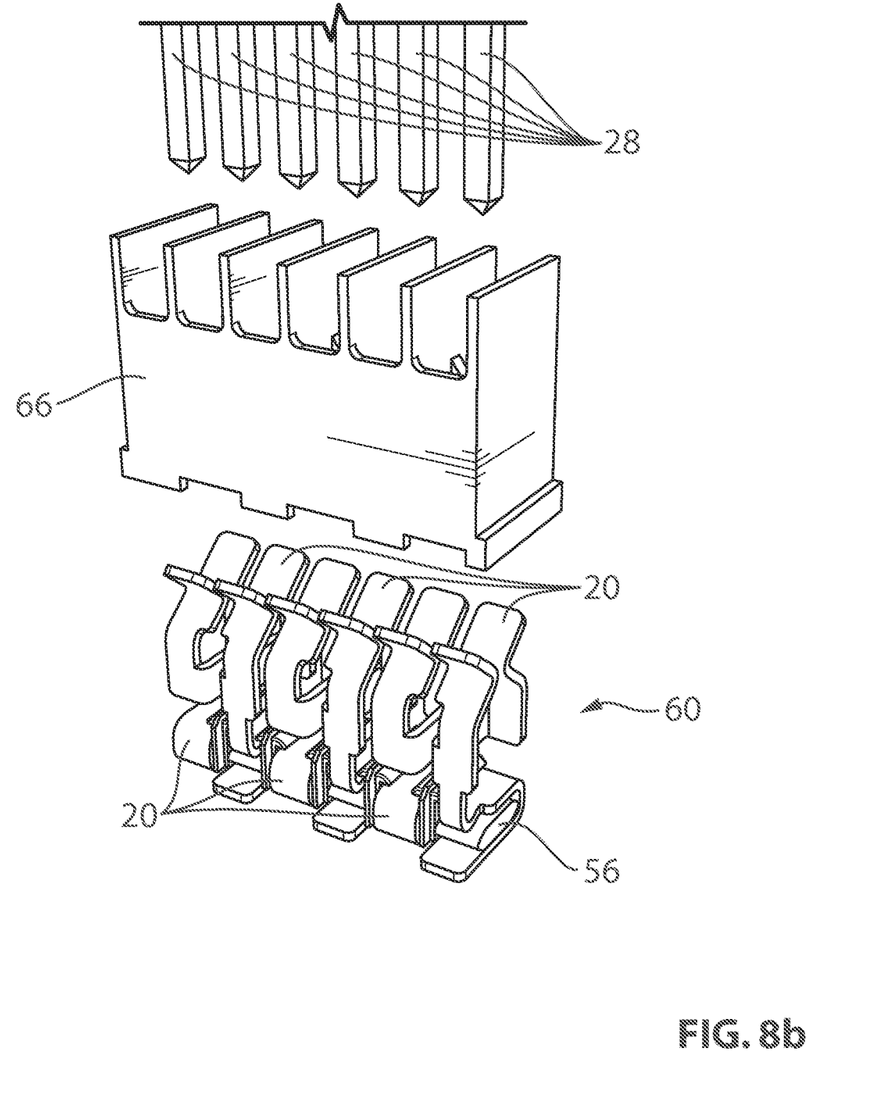

Referring to FIG. 7, the base member 56 includes a plurality of clamp receiving portions 58 which are sized to snugly receive the clamp portions 54 of the female electrical connectors 20, thereby forming a pre-assembly 60 (FIG. 8*b*) that is self-supporting and that can be handled as a single item so as to facilitate assembly of the camera 10. As shown in FIG. 8*a*, the base member 56 may be configured such that successive female electrical connectors 20 alternately connect to the base member 56 from one side shown at 62 and then from the other side shown at 64, which facilitates placement of the female electrical connectors 20 onto the base member 56.

Figure 5:
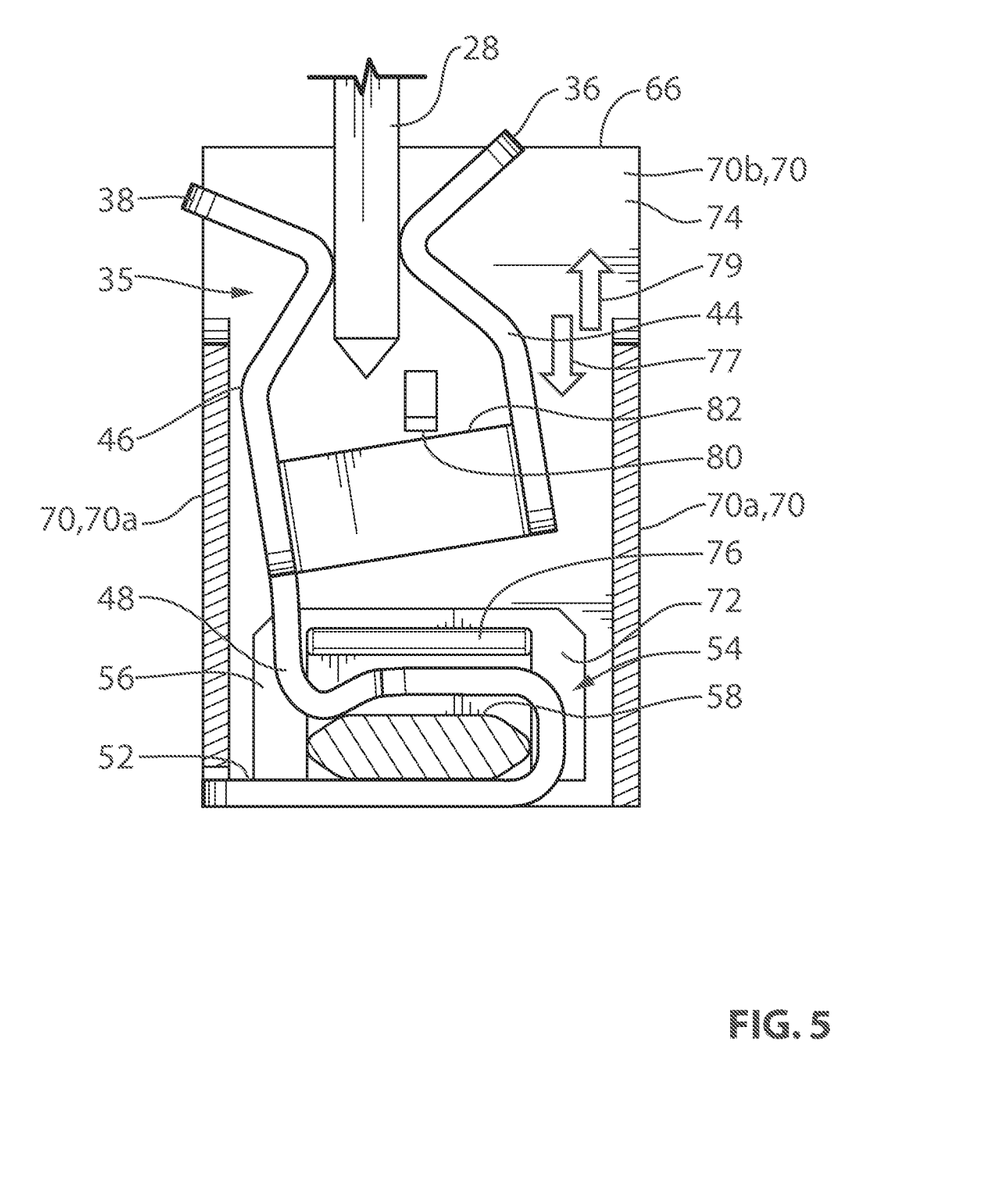
FIG. 5 is a magnified sectional end view of the female electrical connector assembly shown in FIG. 3.

The connector housing 34 further includes an upper member 66, which cooperates with the base member 56 to form chambers 68, each of which houses one of the female electrical connectors 20 (shown in FIGS. 8e and 3). The chambers 68 are defined by chamber walls 70, which include fore and aft walls 70a, divider walls 70b and end walls 70c. Referring to FIG. 5, one of the chambers 68 is shown. As shown, the fore and aft walls 70a serve to limit the movement of the jaw structure 35 along the third axis 50.

The upper member 66 cooperates with the base member 56 to form the divider walls 70b. More particularly, the divider walls 70b have lower portions 72 which are portions of the base member 56 and upper portions 74 which are portions of the upper member 66.

During entry of the male electrical connector 28 into the female electrical connector 20 the male electrical connector 28 will drive the jaw structure 35 of the female electrical connector 20 in a first direction shown by arrow 77 (i.e. downwards in FIG. 5). An entry limit member 76 is provided on one of the chamber walls 70 (e.g., the lower portion 72 of the divider wall 70b), which is engaged by an entry limit shoulder 78 on the female electrical connector 20 to limit the amount of downward movement that the jaw structure 35 will incur during entry of the male electrical connector 28.

During withdrawal of the male electrical connector 28 from the female electrical connector 20, the male electrical connector 28 will pull the jaw structure 35 of the female electrical connector 20 in a second direction 79 (i.e., upwards in FIG. 5) so as to withdraw it from the chamber 68. A withdrawal limit member 80 is provided on one of the chamber walls 70 (e.g., the upper portion 74 of the divider wall 70b), which is engaged by a withdrawal limit shoulder 82 on the female electrical connector 20 to limit the amount of upward movement that the jaw structure 35 will incur during withdrawal of the male electrical connector 28.

The connector housing 34 may be made from any suitable material, such as an electrically insulative material so as to limit or prevent conduction of electrical signals between adjacent female electrical connectors 20. An example material is Nylon 9T, but other suitable materials may be used.

The upper member 66 may connect to the base member 56 fixedly, such as by way of a suitable adhesive. As an alternative to adhesive, a mechanical means may be used, such as snap features, or interference ribs that would provide a force fit. Alternatively, the upper member 66 may connect to the circuit board 14 using some suitable means such as an adhesive and may engage the base member 56 without being connected to the base member 56.

As a result of the configuration of the female electrical connectors 20, the male electrical connectors 28 and the female electrical connectors 20 need not be precisely aligned with respect to either of the second or third axes in order for them to mate together to form a strong electrical connection without causing undue stresses on each other. As a result, the rear housing member 18 can be aligned with the front housing member 16 without damaging the connectors 20 and 28 and while providing a strong electrical connection therebetween. By aligning the front and rear housing members 16 and 18 together, greater control over the overall dimensions of the camera 10 are provided, as compared to an assembly where the rear housing 'floats' relative to the front housing member. As a result, the camera 10 can fit in a smaller space than a similar camera 10 with a floating rear housing member, which is advantageous in today's vehicles where there is a continuing need to fit such cameras in ever shrinking spaces. Further, the non-floating rear housing member 18 may be used as a datum feature during installation of the camera to maintain tight tolerances relative to a camera with a floating rear housing member.

The camera 10 need not be mounted at the rear of a vehicle or as a rearview camera at all. The camera may be mounted anywhere suitable about the vehicle. For example, the camera could face the front or side of the vehicle, or may, for example, face the rear of the vehicle while being mounted on the side of the vehicle (e.g., such as for blind-spot monitoring for the vehicle or the like).

In the illustrated embodiment, the front electrical connectors 20 are female electrical connectors and the rear electrical connectors 28 are male electrical connectors. It is alternatively possible to provide the male electrical connectors on the circuit board 14 as the front electrical connectors and the female electrical connectors as the rear electrical connectors.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. provisional application Ser. No. 61/563,965, filed Nov. 28, 2011, which is hereby incorporated herein by reference in its entirety.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094; and/or 6,396,397, and/or U.S. provisional applications, Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/559,970, filed Nov. 15, 2011; Ser. No. 61/552,167, filed Oct. 27, 2011; Ser. No. 61/540,256, filed Sep. 28, 2011; Ser. No. 61/513,745, filed Aug. 1, 2011; Ser. No. 61/511,738, filed Jul. 26, 2011; and/or Ser. No. 61/503,098, filed Jun. 30, 2011, which are all hereby incorporated herein by reference in their entireties. The system may communicate with other communication systems via any suitable means, such as by utilizing aspects of the systems described in PCT Application No. PCT/US10/038,477, filed Jun. 14, 2010 and published Dec. 16, 2010 as International Publication No. WO 2010/144900, and/or U.S. patent application Ser. No. 13/202,005, filed Aug. 17, 2011, which are hereby incorporated herein by reference in their entireties.

The camera or cameras may comprise any suitable cameras or imaging sensors or camera modules, and may utilize aspects of the cameras or sensors described in U.S. patent application Ser. No. 12/091,359, filed Apr. 24, 2008; and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,965,336; 7,004,606; and/or 7,720,580, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170; and/or U.S. provisional applications, Ser. No. 61/511,738, filed Jul. 26, 2011; and/or Ser. No. 61/503,098, filed Jun. 30, 2011, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional application Ser. No. 60/618,686, filed Oct. 14, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018-A1, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011, which is hereby incorporated herein by reference in its entirety). Optionally, the vision system (utilizing the rearward facing camera and other cameras disposed at the vehicle with exterior fields of view) may the camera or cameras may be part of a vehicle vision system and the vision system may comprise or utilize a plurality of cameras, and the vision system (utilizing a rearward facing camera and sidewardly facing cameras and a forwardly facing cameras disposed at the vehicle) may provide a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/

028686, and/or U.S. patent application Ser. No. 13/333,337, filed Dec. 21, 2011, and/or U.S. provisional applications, Ser. No. 61/570,017, filed Dec. 13, 2011; Ser. No. 61/559,970, filed Nov. 15, 2011; and/or Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 7,855,755; 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. A camera for mounting on a vehicle, the camera comprising:
   a front housing portion;
   a lens mounted to the front housing portion;
   an imager that is positioned to capture image data derived from light received through the lens;
   a circuit board mounted to the front housing portion, wherein the circuit board comprises circuitry that is configured to receive signals from the imager and to send signals to another component, wherein the circuit board has a plurality of front electrical connectors;
   a rear housing member portion, wherein the rear housing portion has a rear housing alignment structure that mates with a front housing alignment structure of the front housing portion to align the rear housing portion with respect to the front housing portion along a first axis;
   wherein the rear housing portion has a plurality of rear electrical connectors extending therefrom, wherein the rear electrical connectors are electrically connected to the front electrical connectors;
   wherein at least one of (i) the front electrical connectors comprise female electrical connectors and the rear electrical connectors comprise male electrical connectors and (ii) the front electrical connectors comprise male electrical connectors and the rear electrical connectors comprise female electrical connectors;
   wherein at least one of the female electrical connectors has a jaw structure including first and second jaws, wherein the first and second jaws together define a second axis along which the first and second jaws engage one of the male electrical connectors, wherein the second axis is generally perpendicular to the first axis, and wherein the first and second jaws are sized so that the male electrical connector is positionable therebetween over a range of positions along the second axis; and
   wherein the female electrical connector has a jaw structure biasing member that biases the jaw structure towards a home position but permits movement of the jaw structure along a third axis that is generally perpendicular to the second axis.

2. A camera as claimed in claim 1, wherein the front electrical connectors comprise female electrical connectors and the rear electrical connectors comprise male electrical connectors.

3. A camera as claimed in claim 2, further comprising a connector housing, wherein the connector housing includes a plurality of chambers, wherein each chamber holds one of the female electrical connectors, wherein each chamber is defined by a plurality of chamber walls and wherein the chambers are separated from each other by the chamber walls, wherein the chamber walls are made from an electrically insulative material.

4. A camera as claimed in claim 3, wherein the connector housing includes a base member that holds the female electrical connectors by friction fit to form a pre-assembly that is self-supporting, and an upper member that cooperates with the base member to form the chambers.

5. A camera as claimed in claim 4, wherein, during mating of the first and second housing portions, the male electrical connectors move in a first direction to enter the jaws of the female electrical connectors, and wherein the connector housing includes an entry stop member associated with each female electrical connector, and wherein the entry stop members are positioned to limit movement of the jaw structures of the female electrical connectors in the first direction during entry of the male electrical connectors into the female electrical connectors.

6. A camera as claimed in claim 5, wherein, during separation of the first and second housing portions, the male electrical connectors move in a second direction to withdraw from the jaws of the female electrical connectors, and wherein the connector housing includes a withdrawal stop member associated with each female electrical connector, and wherein the withdrawal stop members are positioned to limit movement of the jaw structures of the female electrical connectors in the second direction during withdrawal of the male electrical connectors from the female electrical connectors.

7. A camera as claimed in claim 6, wherein the entry stop member is disposed at the base member and the withdrawal stop member is disposed at the upper member.

8. A camera as claimed in claim 3, wherein the chamber walls limit the movement of the jaw structure along the third axis.

9. A camera as claimed in claim 4, wherein each female electrical connector includes a contact for engaging the circuit board and a clamp portion for clamping to the base member of the connector housing, and wherein the contact makes up part of the clamp portion, and wherein the jaw structure biasing member extends from the clamp portion, and wherein the jaw structure extends from the jaw structure biasing member.

10. A camera as claimed in claim 1, wherein each of the first and second jaws of the jaw structure is generally V-shaped and has an apex, and wherein the apex of the first jaw faces the apex of the second jaw, and wherein the V-shape of the first and second laws permits the jaw structure to clamp the male electrical connector when the male electrical connector is received by the jaw structure.

11. A camera as claimed in claim 10, wherein a width dimension of the apex of the first and second jaws is greater than a width dimension of the male electrical connector, and wherein the second axis extends generally across the width dimension of the first and second jaws.

12. A camera as claimed in claim 10, wherein the V-shape of the first and second jaws permits the jaw structure to clamp the male electrical connector when the male electrical connector extends directly along the first axis and the jaw structure is rotated by some amount about the second axis.

13. A camera for mounting on a vehicle, the camera comprising:
front and rear housing portions;
the front housing portion having a lens disposed thereat;
an imager configured to capture image data derived from light received through the lens;
circuitry disposed at the front housing portion, wherein the circuitry receives an output from the imager and generates an output to at least one accessory, wherein the circuitry comprises a plurality of female electrical connectors;
wherein the rear housing portion is configured to mate with the front housing portion via relative movement of the front and rear housing portions along a first axis;
wherein the rear housing portion has a plurality of male electrical connectors extending therefrom, wherein the male electrical connectors are electrically connected to the female electrical connectors when the rear housing portion is mated with the front housing portion;
wherein at least one of the female electrical connectors has a jaw structure configured to receive a corresponding one of the male electrical connectors, wherein the jaw structure is configured to clamp onto and electrically connect with the corresponding male electrical connector;
wherein, when the male electrical connector is received in the jaw structure of the female electrical connector, the male electrical connector is movable relative to the jaw structure along a second axis that is generally perpendicular to the first axis; and wherein the female electrical connector comprises a biasing element that biases the jaw structure of the female electrical connector towards a home position but permits movement of the jaw structure along a third axis that is generally perpendicular to the second axis.

14. A camera as claimed in claim 13, further comprising a connector housing, wherein the connector housing includes a plurality of chambers, wherein each chamber holds one of the female electrical connectors, wherein the chambers are separated from each other by respective chamber walls, wherein the chamber walls are made from an electrically insulative material.

15. A camera as claimed in claim 13, wherein, during mating of the first and second housing portions, the male electrical connectors move along the first axis to enter the jaw structures of the female electrical connectors, and wherein the male electrical connectors are movable relative to the female electrical connectors along the second axis and the jaw structures of the female electrical connectors are movable along the third axis when the male electrical connectors are received in the jaw structures of the female electrical connectors.

16. A camera as claimed in claim 15, wherein an entry stop member associated with the female electrical connector is positioned to limit movement of the jaw structure of the female electrical connector along the first axis during entry of the male electrical connector into the female electrical connector.

17. A camera as claimed in claim 15, wherein a withdrawal stop member associated with the female electrical connector is positioned to limit movement of the jaw structure of the female electrical connector along the first axis during withdrawal of the male electrical connector from the female electrical connector.

18. A camera for mounting on a vehicle, the camera comprising:
front and rear housing portions;
the front housing portion having a lens disposed thereat;
an imager configured to capture image data derived from light received through the lens;
circuitry disposed at the front housing portion, wherein the circuitry receives an output from the imager and generates an output to at least one accessory, wherein the circuitry comprises a plurality of front electrical connectors;
wherein the rear housing portion is configured to mate with the front housing portion via relative movement of the front and rear housing portions along a first axis;
wherein the rear housing portion has a plurality of rear electrical connectors extending therefrom, wherein the rear electrical connectors are electrically connected to the front electrical connectors when the rear housing portion is mated with the front housing portion;
wherein at least one of (i) the front electrical connectors comprise female electrical connectors and the rear electrical connectors comprise male electrical connectors and (ii) the front electrical connectors comprise male electrical connectors and the rear electrical connectors comprise female electrical connectors;
wherein at least one of the female electrical connectors has a jaw structure configured to receive a corresponding one of the male electrical connectors;
wherein, when the male electrical connector is received in the jaw structure of the female electrical connector, the male electrical connector is movable relative to the jaw structure along a second axis that is generally perpendicular to the first axis; and wherein the jaw structure of the female electrical connector is movable along a third axis that is generally perpendicular to the first and second axes, and wherein the jaw structure of the female electrical connector is biased along the third axis and towards a home position.

19. A camera as claimed in claim 18, wherein the jaw structure comprises generally V-shaped first and second jaws that have a respective apex, and wherein the apex of the first jaw faces the apex of the second jaw, and wherein a width dimension of the first and second jaws is greater than a width dimension of the male electrical connector, and wherein the second axis extends generally across the width dimension of the first and second jaws.

20. A camera as claimed in claim 19, wherein the female electrical connector is configured to flex to permit movement of the jaw structure along the third axis and is configured to limit movement of the jaw structure along the second axis.

* * * * *

UNITED STATES PATENT AND TRADEMARK OFFICE
CERTIFICATE OF CORRECTION

PATENT NO. : 9,233,641 B2
APPLICATION NO. : 14/001272
DATED : January 12, 2016
INVENTOR(S) : Matthew C. Sesti and Steven V. Byrne Page 1 of 1

It is certified that error appears in the above-identified patent and that said Letters Patent is hereby corrected as shown below:

In the Specification

Column 6
Lines 55-56, "PCT/US10/038,477" should be --PCT/US10/038477--

In the Claims

Column 10
Line 6, Claim 1, Delete "member" before "portion, wherein"

Column 11
Line 24, Claim 10, "laws" should be --jaws--

Signed and Sealed this
Fifth Day of July, 2016

Michelle K. Lee
*Director of the United States Patent and Trademark Office*